United States Patent

Tounai et al.

[11] Patent Number: 5,448,144
[45] Date of Patent: Sep. 5, 1995

[54] METHOD AND APPARATUS FOR CONTROLLING A ROBOT

[75] Inventors: Shuichi Tounai; Masanori Nishi; Kunihiro Okamura, all of Kitakyushu, Japan

[73] Assignee: Kabushiki Kaisha Yaskawa Denki, Fukuoka, Japan

[21] Appl. No.: 84,270

[22] PCT Filed: Nov. 19, 1992

[86] PCT No.: PCT/JP92/01512
§ 371 Date: Jul. 7, 1993
§ 102(e) Date: Jul. 7, 1993

[87] PCT Pub. No.: WO93/09920
PCT Pub. Date: May 27, 1993

[30] Foreign Application Priority Data

Nov. 22, 1991 [JP] Japan .................................. 3-307651

[51] Int. Cl.[6] .............................................. B25J 13/00
[52] U.S. Cl. ..................... 318/568.12; 318/568.13; 318/568.22; 318/626
[58] Field of Search ................. 318/560, 567, 568.11, 318/568.12, 568.13, 568.16, 568.2, 568.21, 568.22, 626

[56] References Cited

U.S. PATENT DOCUMENTS

| | | | |
|---|---|---|---|
| 4,555,758 | 11/1985 | Inaba et al. | 318/606 X |
| 4,591,944 | 5/1986 | Gravel . | |
| 4,980,839 | 12/1990 | Souji et al. | 318/568.22 |
| 5,130,632 | 7/1992 | Ezawa et al. | 318/568.11 |

FOREIGN PATENT DOCUMENTS 55-56961  4/1980  Japan .
61-109691  5/1986  Japan .

Primary Examiner—Bentsu Ro
Attorney, Agent, or Firm—Jordan and Hamburg

[57] ABSTRACT

A method for controlling a robot that comprises shafts having one degree of freedom or a plurality of degrees of freedom, and where a dynamic load is applied to at least one of the above shafts, the shafts being driven by a servo motor via a speed reducer, includes the steps of stopping the robot at a point, thereafter moving the shaft to which the load is applied in a load acting direction and thereafter stopping the shaft.

The efficiency (normal efficiency) from the servo motor to the arm (shaft) forms an inverse number relative to the efficiency (reverse efficiency) from the arm to the servo motor. A condition of transmitting the load from the arm is intentionally made and the load is made to establish equilibrium with the torque generated by the servo motor, thus reducing the consumption of electricity and the generation of heat.

2 Claims, 3 Drawing Sheets

METHOD AND APPARATUS FOR CONTROLLING A ROBOT

FIELD OF ART

This invention relates to a method and apparatus for controlling a robot wherein the torque of a servo motor is transmitted to a robot arm by way of a speed reducer, and more particularly, to the holding of a load while the robot is in a stopped condition.

BACKGROUND OF THE INVENTION

Particularly among industrial robots, there are some which utilize hydraulics as drive means thereof. However, the robots generally employ servo motors and the torque of the servo motors is usually transmitted to a robot arm by way of a speed reducer.

Meanwhile, in the teaching playback robot, the plurality of points on a path along which the robot arm passes are preliminarily taught and, at the time of playback, the robot is controlled by an interpolation of teaching points so that the robot arm moves along the path from one teaching point to another teaching point.

Conventionally, when the robot moves from one teaching point to another teaching point, once the robot reaches a target point, the robot is stopped without considering the conditions of the loads applied to the respective shafts of the robot.

Therefore, it is often the case with any one of the robot shafts that when the movement of the arm from one teaching point to another teaching point is in a direction to lift a load, the robot shaft is stopped in the load lifting condition even after the completion of the movement.

FIG. 1 exemplifies such a movement, wherein numeral 1 indicates a first shaft, numeral 2 indicates a second shaft, numeral 3 indicates a third shaft and capital letter W indicates a load. In FIG. 1, when the respective shafts move from positions shown with a solid line to positions shown with a hyphenated line which represents subsequent teaching points, the second shaft 2 moves in a direction to lift the load W and is stopped in the load lifting condition. Here, no brake means is provided for maintaining the stopped condition.

If the drive system of the above shafts comprises a servo motor 4, a speed reducer 5 and an arm 6 comprised of any desired shafts, the transmission of the torque from the servo motor 4 to the arm 6 is expressed as follows.

$$T_L = T_{MO} \times \eta i$$

$$\therefore T_{MO} = T_L / (\eta \times i) \quad (1)$$

wherein, $T_{MO}$: required motor torque
$\eta$: normal efficiency of the speed reducer ($\eta < 1$)
$1/i$: speed reduction ratio
$T_L$: torque on arms by loads Meanwhile, the torque transmission from the load W to the servo motor 4 is expressed as follows.

$$T_M = T_L \eta' \times (1/i) \quad (2)$$

wherein, $T_{M1}$: required motor torque
$\eta'$: reverse efficiency of the speed reducer ($\eta' < 1$)

As described previously, since the normal efficiency $\eta$ ($<1$) is the inverse of the reverse efficiency $\eta'(<1)$, the load applied to the servo motor 4 for driving the shaft greatly differs between a case (a) in which the arm is moved in a load lifting direction and then is stopped while maintaining the load lifting condition and a case (b) in which the arm is moved while holding the load and then is stopped.

Therefore, in the case (a), the servo motor consumes a considerable amount of electricity and eventually increases the generation of heat which will adversely affect the accurate operation of the motor.

Accordingly, the task to be achieved by this invention lies in stopping the robot under the condition (b), thus reducing the required torque of the servo motor and the generation of heat.

SUMMARY OF THE INVENTION

To solve the above task, the method for controlling the robot according to this invention lies in that, in controlling a robot wherein the robot comprises shafts having one degree of freedom or plural degrees of freedom and a dynamic load is applied to at least one of the above shafts, the shafts being driven by a servo motor via a speed reducer, the improvement is characterized in that the shaft to which the load is applied is moved in a load acting direction and thereafter is stopped.

Furthermore, the apparatus for controlling the robot according to this invention lies in that, in an apparatus for controlling a robot wherein the robot comprises shafts having one degree of freedom or plural degrees of freedom and a dynamic load is applied to at least one of the above shafts, the shafts being driven by a servo motor via a speed reducer, the improvement is characterized in that the controlling apparatus comprises means to judge whether the robot is stopped or not by detecting the servo deviation, means to reset a timer and to select a shaft to be moved in a load acting direction from shafts upon receiving a teaching pulse signal, and means to provide a command of minute movement to the selected shaft in a direction opposite to the load acting direction when the timer at the above judgment processing is up provided that the robot is stopped, and means to provide a command of movement to the selected shaft to move and return the selected shaft to the original position.

This invention is enabled by the discovery that the efficiency (normal efficiency) of transmission from the servo motor to the arm (shaft) forms an inverse number relative to the efficiency (reverse efficiency) of transmission from the arm to the servo motor. The invention intentionally creates a condition in which the load is transmitted from the arm so as to make the load establish the equilibrium with the torque generated by the servo motor, thus reducing the consumption of electricity and the generation of heat.

To be more specific, when the robot is stopped at a point, the directions of the dynamic loads which are applied to the respective shafts in a stopped condition are judged and, if the robot's stopped condition continues for a predetermined time, the shafts to which loads are applied are moved a minute distance in a direction opposite to the load acting direction and thereafter returned to the stopped position to obtain the condition (b).

With this invention, the load of the servo motor at the stopped condition can be reduced, the consumption of electricity is reduced and the generation of heat is reduced. In addition, the capacity of the servo motor can also be reduced.

DESCRIPTION OF THE PREFERRED EMBODIMENT

Hereinafter, this invention is physically explained in view of an embodiment.

Figure 1:
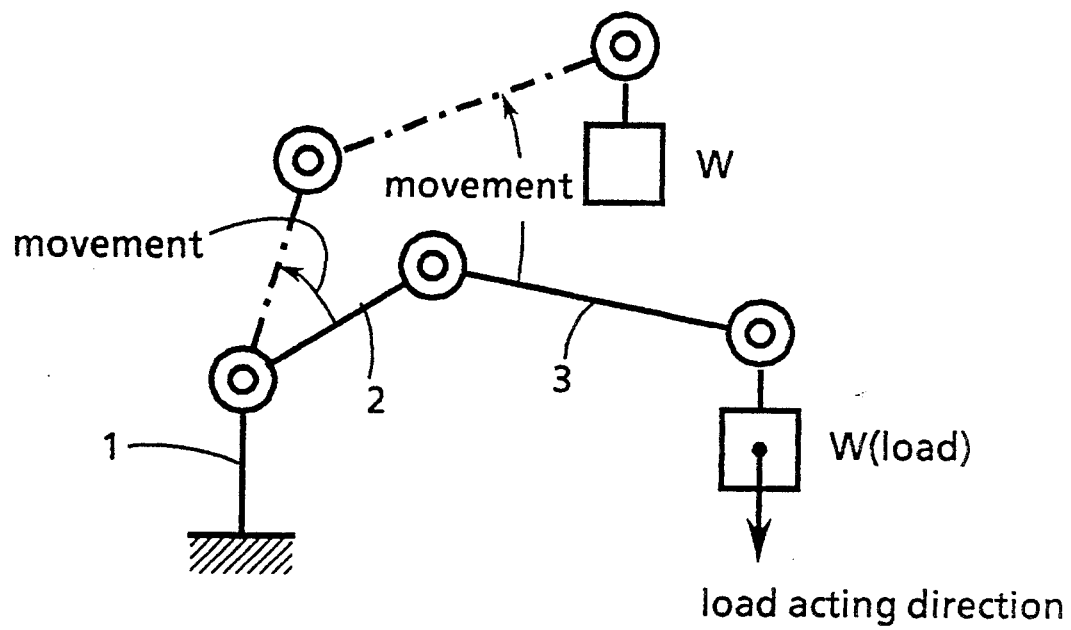
FIG. 1 is a schematic view of a robot having three shafts lifting a load.
Figure 2:
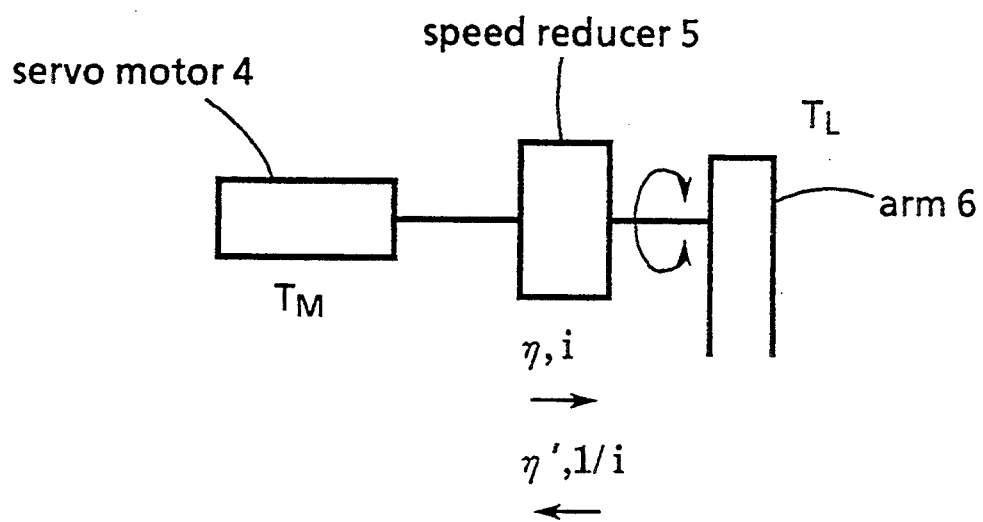
FIG. 2 is an explanatory view explaining the torque transmission from the servo motor to the arm.
Figure 3:
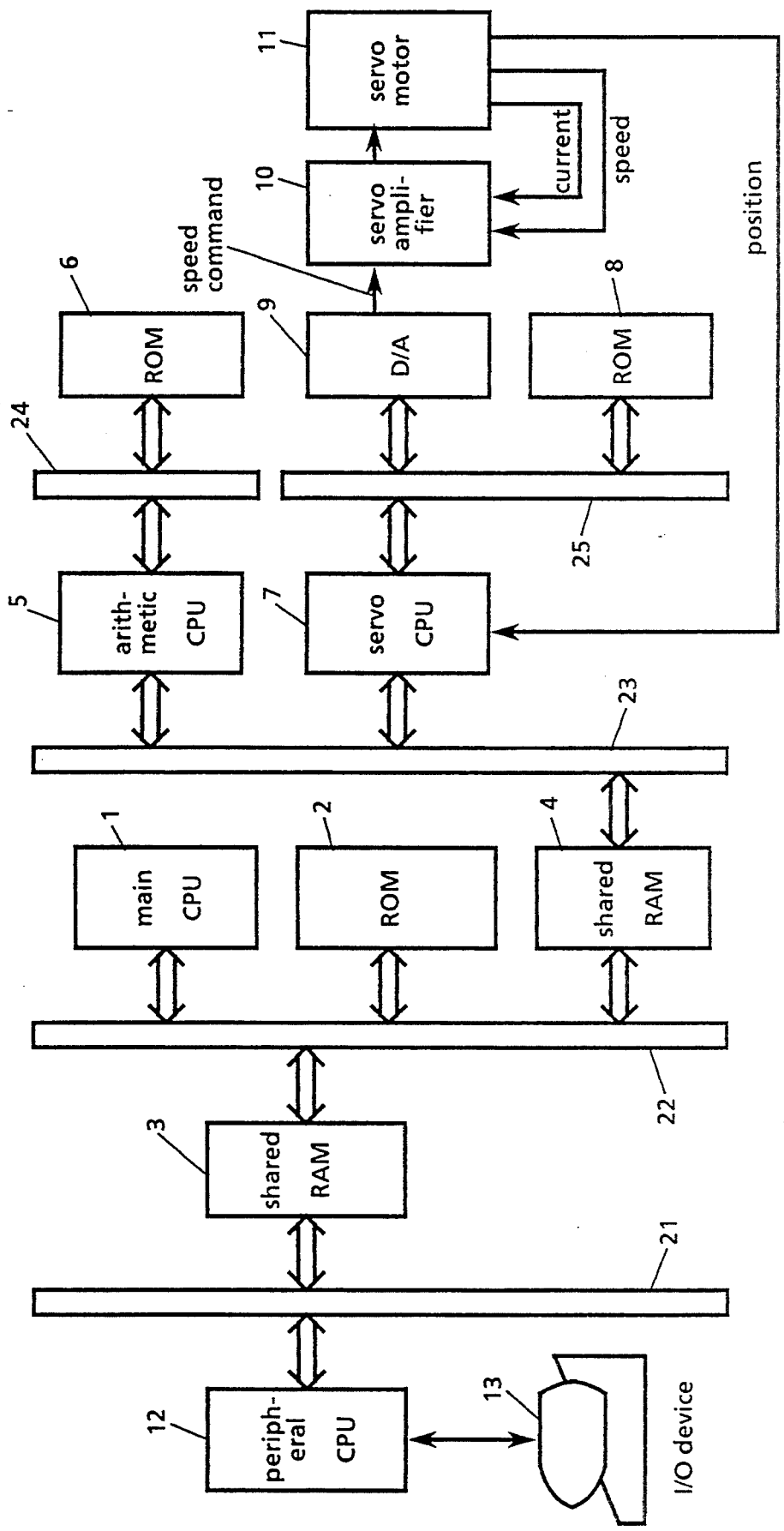
FIG. 3 is a block diagram showing the construction of the robot controlling apparatus according to this invention.

FIG. 3 is a block diagram showing the construction of the robot controlling apparatus according to this invention. Motor control parameters are stored in a ROM 6 which is connected to an arithmetic CPU 5.

When the system is initialized, the motor control parameters are transferred to a shared RAM by the following path.

ROM 6→bus 24→arithmetic CPU 5→bus 23→shared RAM 4→bus 22→shared RAM 3

The control parameters which are transferred to the shared RAM 3 can be altered by an operator operating an I/O device 13 which is connected to a peripheral CPU 12. The control parameters which are stored in the shared RAM 3 are transferred to the shared RAM by the following path so that a servo CPU can have access to the control parameters.

shared RAM 3→main CPU 1→bus 22→shared RAM 4

In an ordinary or routine robot control, the program execution commands are transferred to the servo CPU by way of the bus 22, the shared RAM 4 and the bus 23 and the servo CPU 7 transfers control signals to a D/A converter 9 by way of a bus 25. The D/A converts digital signals to analog signals and provides speed commands to a servo amplifier 10. The servo amplifier 10 includes, for example, an inverter and provides torque commands to a servo motor 11 to drive a robot arm.

Figure 4:
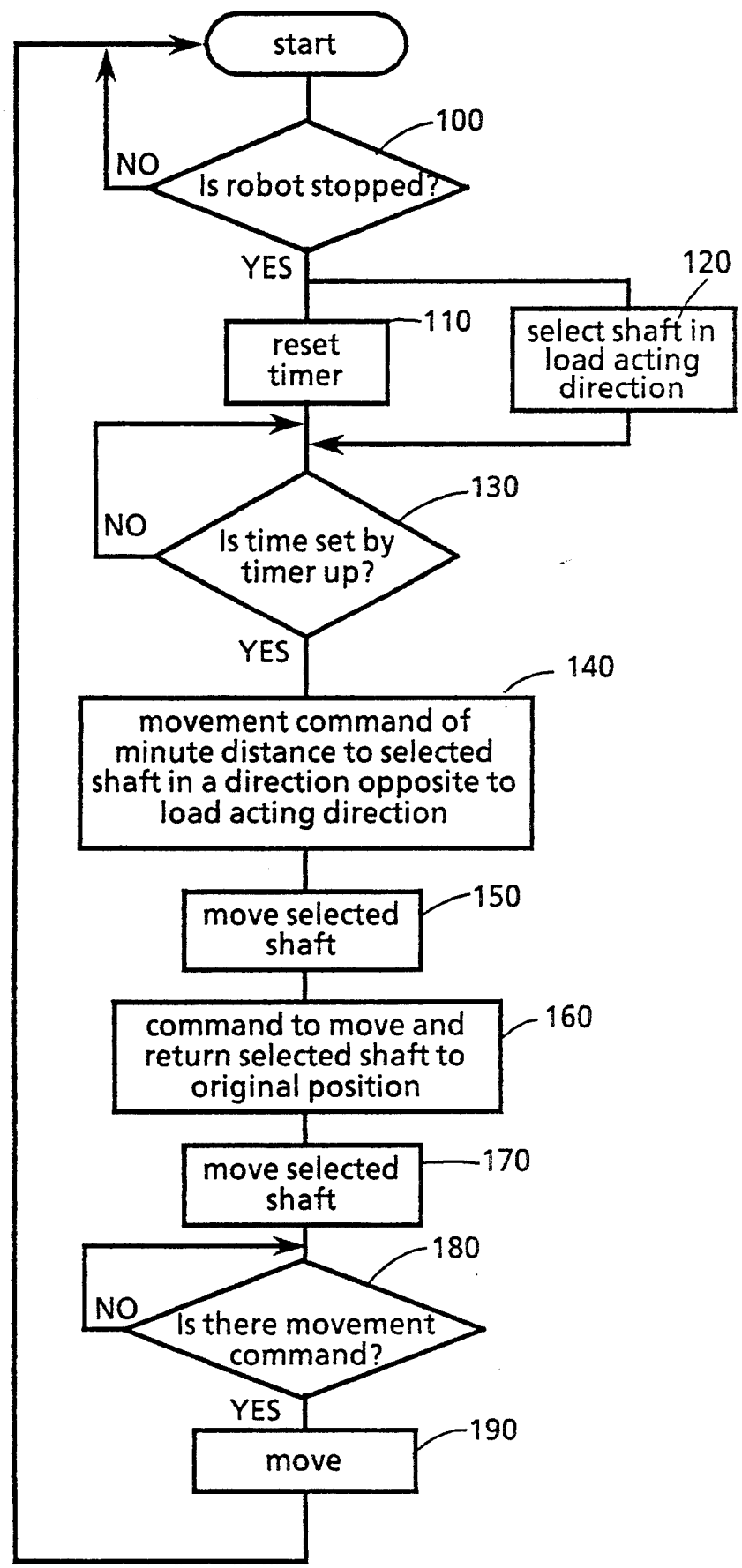
FIG. 4 is a flow chart showing one example of the method according to this invention.

FIG. 4 is a flow chart showing one embodiment of this invention which is executed by the servo CPU 7. In the drawing, at step 100, whether the robot is stopped or not is judged in view of the deviation between a position feedback signal from the servo motor in FIG. 3 and a position command signal. If the robot is stopped, a timer is reset at step 110 and the load acting direction shafts are selected at step 120. To be more specific, the shafts which make the servo motor 11 generate torque to drive the robot arm in a direction opposite to gravity while the robot arm is stationary are selected as load acting direction shafts. When the timer is up at step 130 which executes the decision processing, a movement command of a minute distance, for example, several pulses, are provided to the servo motor at step 140 to move the load acting direction shafts in a direction opposite to the load acting direction. Subsequently, at step 150, the load acting direction shafts are moved. Then, the movement command to return the load acting direction shafts to the original position is generated at step 160 and the load acting direction shafts are returned to the original position at step 170. If there exists a movement command in decision processing at step 180, the load acting direction shafts are moved at step 190 and are returned to the original position.

To prevent the transfer of execution commands of an operation program from the main CPU to the servo CPU 7 during the execution from step 140 to step 170, a wait command is provided to the main CPU 1 from the servo CPU 7 and, after the completion of the processing at step 170, a reset signal for the wait command is generated so that interference to the operation of this invention by another program can be avoided.

The torque reduction rate according to this invention is expressed as follows using the above-mentioned equations 1 and 2.

$$\begin{aligned}
\text{torque reduction rate} &= \frac{\text{motor torque for lowering load}}{\text{motor torque for lifting up load}} \times 100\% \\
&= \frac{T_{M1}}{T_{M0}} \times 100 = \frac{T_L \times \eta' \times (1/i)}{T_L/(\eta \times i)} \\
&= \eta \times \eta' \times 100 \, (\%)
\end{aligned}$$

For example, assuming that the normal efficiency $\eta$ from the servo motor to the arm in a robot is 0.7 and the reverse efficiency $\eta'$ is 0.7, while the motor torque $T_{M0}$ for lifting the load is 100%, the motor torque $T_{M1}$ for lowering the load is expressed as follows.

$$\begin{aligned}
T_{M1} &= T_{M0} \times \text{torque reduction rate} \\
&= 100 \times 0.7 \times 0.7 \\
&= 49\%
\end{aligned}$$

In effect, a remarkable torque reducing effect can be achieved.

INDUSTRIAL FEASIBILITY

This invention can be utilized to control various industrial robots.

We claim:

1. Apparatus for controlling a robot wherein the robot comprises shafts having at least one degree of freedom and a dynamic load is applied to at least one of the shafts, said shafts being driven by a servo motor via a speed reducer, the controlling apparatus comprising:
   means to determine whether the robot is stopped or not by detecting a servo deviation,
   means to reset a timer and to select a shaft to be moved in a load acting direction from the shafts receiving a teaching pulse signal,
   means to provide a command of minute movement to the selected shaft in a direction opposite to the load acting direction when the timer at the above determination processing has counted a preset time, provided that the robot is stopped, and
   means to provide a command of movement to the selected shaft to move and return the selected shaft to an original position thereof.

2. A method for controlling a robot wherein the robot comprises shafts having at least one degree of freedom and a dynamic load is applied to at least one of the shafts, said shafts being driven by a servo motor via a speed reducer, the method comprising the steps of:
   determining whether the robot is stopped or not by detecting a servo deviation, resetting a timer and to select a shaft to be moved in a load acting direction from the shafts receiving a teaching pulse signal, providing a command of minute movement to the selected shaft in a direction opposite to the load acting direction when the timer at the above determination processing has counted a preset time, provided that the robot is stopped, and providing a command of movement to the selected shaft to move and return the selected shaft to an original position thereof.

* * * * *